Jan. 26, 1971   B. BACH   3,557,388
MARINE TOILET SEWAGE SYSTEM
Filed Feb. 9, 1970
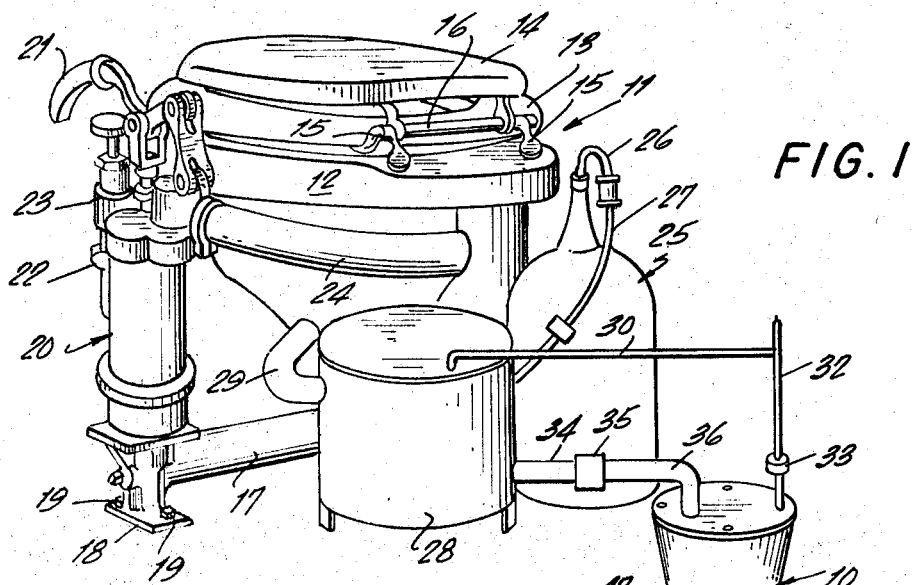
INVENTOR.
BERT BACH
BY Eliot S. Gerber
ATTORNEY

United States Patent Office 3,557,388
Patented Jan. 26, 1971

3,557,388
MARINE TOILET SEWAGE SYSTEM
Bert Bach, 270 West End Ave., New York, N.Y. 10023
Filed Feb. 9, 1970, Ser. No. 9,660
Int. Cl. E03d 5/00, 9/02
U.S. Cl. 4—10                                    6 Claims

ABSTRACT OF THE DISCLOSURE

A marine toilet includes a chamber in which waste products are mixed with a chemical. The chamber breaks up solid waste. The inlet and outlet pipes to the chamber have operative valves which close the chamber. A flexible diaphragm then acts directly upon the liquid in the chamber.

DESCRIPTION

The present invention relates to marine toilets and more particularly to a toilet for use on boats which chemically tretas the waste products and discharges the treated waste.

Soon a federal anti-pollution regulation will require that all toilet waste products from marine toilets be chemically treated before they are flushed overboard into fresh water. This presents a serious problem to boat owners as many marine toilets simply flush their untreated contents into the surrounding water.

At the present time there are three major types of marine toilets on the market which would comply with the anti-pollution regulation. All three types have disadvantages. In one type the waste products are collected in a disposable plastic container. The disposal of the contained may be unpleasant or inconvenient. In the second type, rotating blades or vanes are used to break up the solid wastes and the mixture is chemically treated. However, the blades or vanes become clogged and may become inoperative. They also become encrusted with waste. Their cleaning may be a difficult and unpleasant task. The third type of marine toilet utilizes ultrasonic waves. That type may be expensive and its waves may cause the paint to come off the boat and cause other damage.

It is an objective of the present invention to present a marine toilet which is relatively free from the necessity of frequent cleaning or repair; which will break up solid wastes and thoroughly chemically treat the waste products; and which is simple in operation and relatively low in cost.

In accordance with the present invention a toilet and waste treatment device are presented. The toilet may, either manually or by pumping or by an electric pump, utilize the water around the boat to flush the toilet bowl. The water and waste are carried, by gravity or pump action, to a holding chamber. The holding chamber has an inlet line having a flush valve and an outlet line having a valve. The outlet line is to a second chamber. A flexible diaphragm forms one wall, or part of one wall, of the second chamber. The diaphragm is arranged to be below the level of the liquid. A chemical for the treatment of sewage is added, for example by siphon or puming action, to the liquid in the first chamber. A shaft, fixed to the diaphragm, is oscillated after the liquid is within the second chamber and the valves in its inlet and outlet pipes are closed.

The oscillation of the diaphragm against the liquid, reacting with the closed and limited body of air above the liquid, causes any solid waste to break up, causes all the waste to be impregnated with the sewage treatment chemical and generally causes the waste to be liquefied. The chemical may remain with the liquid in the second chamber for a sufficient period of time for its chemical action to occur. Then the chamber is pumped free of the liquid waste, either manually or by motor, and the treated waste pumped into the surrounding water. Alternatively, the liquid, after liquefication in the second chamber, may flow or be pumped to a third chamber in which it is held for a sufficient period of time for further chemical action to occur. The treated waste liquid is then pumped into the surrounding water.

Other objectives of the present invention will be apparent from the following detailed description of the inventor's best mode of practicing the invention. The description should be taken in conjunction with the accompanying drawings, in which:

FIG. 1 is a perspective view of the marine toilet and treatment device of the present invention;

FIG. 2 is a side cross-sectional view of the marine toilet and treatment device of the present invention; and FIG. 3 is a side view of its motor control with its side cover removed.

Referring now specifically to the drawing, the numeral 10 generally designated the chlorinator treatment tank of the present invention which is used in conjunction with a marine toilet 11 of a conventional construction. The toilet includes a commode bowl 12, seat 13, cover lid 14 and mounting brackets 15 connected to the bowl. The brackets 15 are provided with a transverse rod 16 hingedly mounting both the seat 13 and the cover lid 14. The bowl 12 is mounted on a base fitting 17 which is supported on the supporting surface by horizontal flanges 18 and fastening bolts 19. Mounted on the base fitting 17 and in communication therewith is a soil pump 20. Soil pump 20 is provided with an operating handle 21 at its upper end disposed alongside of the seat. The upper part of the soil pump 20 receives water from an inlet 22 through a control valve 23. The water is discharged through a discharge pipe 24 into the commode bowl 12 for flushing the bowl. The bowl is discharged through outlet pipe 29 into tank 28.

Disposed alongside of the commode bowl 12 is a large container 25 containing sodium hypochlorite or another suitable sewage treatment chemical. Preferably the chemical is a dilute alkali chloride solution providing free chlorine. The container 25 has a siphoning tube 26 in its open end. The siphoning tube 26 is connected to a conduit 27 extending to the holding tank 28. If, as shown in the embodiment of FIG. 1, the treatment device has a first chamber and a second chamber, then the conduit is connected to the first chamber. The conduit 27 has a one-way solenoid operated valve or one-way valve which permits the chemical to be siphoned or pumped from the container 25 but does not permit air or liquid to go backwards up the conduit. The waste from the toilet 11 is flushed out, or is pumptd out, from the commode bowl 12 through pipe 29 into tank 28. The holding tank 28 has a vent line 30.

The treatment tank 10 of the present invention is shown in FIGS. 1 and 2. Its side walls 31 are of a rigid material, for example, porcelain coated steel with the porcelain coated on the inside and outside. Preferably the chamber is round in all top-cross-sectional views. A poreclain coated top is removably secured by bolts to a flange of the side wall. A vent line 32, having a solenoid operated valve 33, connects the treatment tank interior to the exterior. The holding tank outlet pipe 34 is connected to a closable solenoid operable valve 35. The opposite side of valve 35 is connected to pipe 36 which leads into chamber 10. The chamber 10 is supported on legs 37. A motor 38, positioned beneath the chamber 10, rotates a disk 39. A pin on disk 39 is positioned eccentrically near its edge. That pin is pivotally connected to a short tie rod 40. Tie rod 40 is pivotally connected to one end of connecting rod 41. The opposite end of connecting rod 41 is pivotally connected to thrust rod 42, which rides in plain bearing 43. The upper end of thrust rod 42 is secured to flexible diaphragm 44. The diaphragm 44 preferably forms all, or a part of, the bottom of chamber 10. Alternatively, the diaphragm 44 may be mounted on a side wall of the chamber. In whichever location it is situated, the diaphragm should be below the normal liquid level in the chamber. The edge of the diaphragm is held by ring 45 which forms a leakproof seal. Preferably the diaphragm is of artificial rubber coated on its inside surface with a cleanable or non-adherable plastic resin such as polytetrafluoroethylene.

The outlet pipe 46, at the bottom of tank 10, leads to solenoid operable valve 47. The pipe 48 from valve 47 discharges the waste into the water about the boat. The system shown in FIGS. 1 and 2 uses gravity discharge, which suffices when the discharge port is below the treatment tank 10; otherewise, a pumping system must be used.

The timing and control mechanism is shown in FIG. 3. It consists of a series of cams 49a–49e rotated by a timing motor 62. Each cam is associated with a micro-switch 50a–50e with an arm of the microswitch riding on its associated cam. Each switch 50a–50e has its controlled wire 51a–51e. When the raised portion of the cam is rotated, by the timing motor, to press upon an arm of its associated microswitch 50a–50e, it closes the microswitch and closes the valve connected with its wire. The timing motor 62 is a small motor having a gear reduction system such that its end shaft rotated 360° at a predetermined period, for example, five minutes. The cam 49a operates switch 50a whose wire 51a may be connected to the chlorinator valve, although in the described embodiment that valve is otherwise operated. The cam 49b operates switch 50b connected by wire 51b to the motor 38 which operates the diaphragm. The cam 49c operates switch 50c whose wire 51c is connected to and controls the three valves 33, 35 and 47. The valves 33, 35 and 47 operate simultaneously to close off the treatment tank 10. The motor 62 is started by means of a float switch 61 near the top of treatment tank 10.

In the cycle of operation, waste products and flushing water are flushed or pumped from the commode into the holding tank 28. At that time valves 35, 47 and 33 are closed. The float valve 60, when the liquid level reaches a predetermined amount, is actuated and opens valves 27, 35 and 33. The valves 35 and 33 stay open long enough, upon being opened, to drain tank 28. Operation of float valve 60 causes the waste, with the chlorine, to enter treatment tank 10. When the liquid in the treatment tank reaches near the top, it operates float switch 61. The float switch 61 starts timing motor 62 which, by its cams, in sequence: (1) closes the valve 35 and vent valve 33; (2) locks the valve 35 closed; (3) starts, continuates (for example for 3½ minutes) and shuts off the motor 38; and (4) opens the valve 47 and vent valve 33 for a period sufficient to drain tank 10. The inlet valve 35 to the treatment tank is opened mainly by the float valve 60 near the top of holding tank 28. The cam only controls valve 35 to insure its being closed during operation of motor 38. The diaphragm, being oscillated upwards and downwards against the closed body of air and liquid during operation of motor 38, breaks up the solid waste in treatment tank 10. The chemical material is substantially mixed with the waste products. The motor 38 is then shut off, the vent valve 33 and outlet valve 47 opened and the waste flowed out of the treatment tank 10.

The shape of the treatment tank 10 is shown as being round in top view cross-sections and having an indentation near its center, seen in side view. That shape takes advantage of the reverberation effect. The tank may be correctly designed, using shock-wave concepts, to optimize the mixing effect produced by the movement of the diaphragm.

Modifications may be made in the described embodiment within the scope of the subjoined claims. For example, the holding tank may be eliminated, to provide a simpler system, and the commode connected directly with the treatment tank. The only purpose of the holding tank is to enable the toilet to be flushed during the time the treatment tank is closed and operating. A tank may be added in series after the treatment tank to hold the mixed waste and water and provide additional time for the chemical action to occur. The commode may be pumped out by an electric pump rather than, as described, a hand pump. The solenoid operated valves may be provided with hand-operated safety mechanism so the valves may be opened in case the power or the solenoids fail. The holding and treatment tanks may be at the same, or diffrent, levels and the waste and water electrically pumped from the holding to the treatment tank. The chemical may be added to the water in the holding tank rather than waiting until the treatment tank.

I claim:

1. A marine toilet including a commode having a bowl, means to flush the commode bowl with water, an outlet pipe connected to the bowl to receive the flushed water, a treatment tank having an inlet pipe connected in series with said outlet pipe to receive said flushed water, a first operative valve in said treatment tank inlet pipe operable to open and close the opening through said inlet pipe, a discharge pipe connected to said treatment tank to discharge treated waste, a second operative valve in said discharge pipe to open and close the opening therethrough, a flexible diaphragm within said treatment tank and positioned below the level of flushed water whose ocsillation mixes the chemical and flushed water, and means to oscillate said diaphragm when the two said valves are both operated to be closed.

2. A marine toilet as in claim 1 wherein the means to oscillate the diaphragm is an electric motor having an output shaft which is connected to a disk, said disk having eccentric means connected by a linkage to the diaphragm.

3. A marine toilet as in claim 2 and also including a second tank for the holding of the flushed liquid, said second tank being connected to the outlet pipe of said bowl and said holding tank having a discharge pipe which is the inlet pipe of the treatment tank.

4. A marine toilet as in claim 1 and including a chemical dispenser connected to said treatment tank to discharge therein a treatment chemical.

5. A marine toilet as in claim 1 wherein the said valves are solenoid operated and the said solenoids are controlled by a series of cams which act upon switching means.

6. A marine toilet as in claim 1 wherein said treatment tank also includes a vent line having an aperture valve.

References Cited

UNITED STATES PATENTS

| | | | |
|---|---|---|---|
| 3,044,077 | 7/1962 | Belden | 4—10 |
| 3,094,707 | 6/1963 | Flaming | 4—77 |
| 3,228,036 | 1/1966 | Zaska et al. | 4—77 |
| 3,275,550 | 9/1966 | Daubanspeck | 4—77X |
| 3,320,621 | 5/1967 | Vita | 4—10 |
| 3,460,165 | 8/1969 | Drobny | 4—115 |

LAVERNE D. GEIGER, Primary Examiner

H. K. ARTIS, Assistant Examiner

U.S. Cl. X.R.

4—115